United States Patent [19]
Zdepski et al.

[11] Patent Number: 5,825,884
[45] Date of Patent: Oct. 20, 1998

[54] METHOD AND APPARATUS FOR OPERATING A TRANSACTIONAL SERVER IN A PROPRIETARY DATABASE ENVIRONMENT

[75] Inventors: Joel Walter Zdepski, Mountain View; Howard Geza Page, Burlingame, both of Calif.

[73] Assignee: Thomson Consumer Electronics, Indianapolis, Ind.

[21] Appl. No.: 674,268

[22] Filed: Jul. 1, 1996

[51] Int. Cl.$^6$ ........................................ H04L 9/32
[52] U.S. Cl. ................ 380/25; 380/10; 380/30; 455/4.2
[58] Field of Search ................ 380/23, 25, 30, 380/10, 20; 455/4.1, 4.2, 5.1

[56] References Cited

U.S. PATENT DOCUMENTS

| | | |
|---|---|---|
| 4,533,948 | 8/1985 | McNamera et al. . |
| 5,163,097 | 11/1992 | Pegg .......................................... 380/21 |
| 5,392,353 | 2/1995 | Morales . |
| 5,497,420 | 3/1996 | Garneau et al. .......................... 380/20 |

*Primary Examiner*—Gilberto Barrón, Jr.
*Attorney, Agent, or Firm*—Jeffrey D. Carter; Bruce J. Bowman

[57] ABSTRACT

A transactional server system for transferring subscriber information requests to information service providers, and methods of operating the same result in discouraging reconstruction of the subscriber information. The transactional server system comprises a subscriber platform which transfers an encrypted identification and a message request block. A transaction server is coupled to the subscriber platform to initiate a subscriber information request in response to the message request block and the encrypted identification, and transfer the message request block to the information service providers in response to subscriber information. A database server coupled to the transaction server and having a plurality of subscriber information receives the subscriber information request and decrypts the encrypted identification to provide the subscriber information to the transaction server.

49 Claims, 6 Drawing Sheets

METHOD AND APPARATUS FOR OPERATING A TRANSACTIONAL SERVER IN A PROPRIETARY DATABASE ENVIRONMENT

BACKGROUND OF THE INVENTION

1. Field of the Invention

The present invention generally relates to operations of transactional servers in an interactive TV network and more particularly to protecting unauthorized reconstruction of server databases operating with the transactional servers.

2. Incorporation by Reference

U.S. Pat. No. 5,448,568 entitled "System of Transmitting An Interactive TV Signal" assigned to Thomson Consumer Electronics, Inc. issued Sep. 5, 1995 is herein incorporated by reference in its entirety.

3. Description of the Related Arts

Interactive TV networks provide its users a vast variety of viewing options at users leisure. The viewing options include television programming, advertisements, and other communicable information from home banking to dentist appointments. Interactive TV networks enable for example advertisers to produce interactive advertisements. Users or subscribers of the interactive TV system can be solicited with the interactive advertisements that provide the subscribers the option to request more information about the advertised product. The advertiser may for example provide the subscriber with the requested information through normal mailing channels.

As interactive TV networks become more and more widespread, specialized segments for providers to the interactive TV system will be developed and become more prominent. Because these specialized segments are interrelated to each other by the interactive TV system, devices operating in these segments interface with each other to provide data transfers. There are instances when data transfers between the segments will divulge proprietary data that jeopardies the livelihood of a particular segment. In those instances, safeguards are required to protect the specialized segments from divulging proprietary data.

For instance, the interactive advertising example provides for a specialized segment such as a subscriber database with a need to protect proprietary data during interactions with other segments of the interactive TV network. The subscriber database provides subscriber personal information to the advertisers in response to a subscriber request on the interactive TV network. Given that there are many advertisers and many interactive TV network providers offering access to the interactive TV system, the subscriber database having a cross reference between the subscriber personal information and a subscriber identification on the interactive TV network becomes valuable proprietary data that has to be protected.

Therefore, it is desirable to provide a transactional server operating in an interactive environment, and methods of operating the same that provide protection for certain proprietary databases interacting with other segments of the interactive environment.

SUMMARY OF THE INVENTION

The present invention provides a system for operating a transactional server and method for operating the same which result in protecting a database from unauthorized reconstruction. The novel transactional server architecture is based on encryption of messages between devices. Thus, according to one aspect of the invention, a transactional server system for transferring subscriber information requests to information service providers is provided. The transactional server system comprises a subscriber platform which transfers an encrypted identification and a message request block. A transaction server is coupled to the subscriber platform to initiate a subscriber information request in response to the message request block and the encrypted identification, and transfer the message request block to the information service providers in response to subscriber information. A database server coupled to the transaction server and having a plurality of subscriber information receives the subscriber information request and decrypts the encrypted identification to provide the subscriber information to the transaction server.

According to another aspect of the invention, the message request block includes a plurality of informational requests. The database server authenticates the encrypted identification received from the transaction server to verify that the encrypted identification originated from the subscriber platform and not a message from the transaction server in an effort to reconstruct the contents of the database server.

According to another aspect of the invention, public key cryptography provides encryption of the message. Thus, the subscriber platform includes a database server public key and generates the encrypted identification with the database server public key. The database server includes a database server private key to decrypt the encrypted identification. The subscriber platform includes a subscriber platform private key and generates a signed hash with the subscriber platform private key from the message request block.

According to yet another aspect of the invention, the transaction server generates a message request block hash in response to the message request block. The message request block includes the signed hash from the subscriber platform and the message request block hash from the transaction server. The database server receives the message request block and includes a subscriber public key to decrypt the signed hash to provide a subscriber signature that is compared with the message request block hash to authenticate the subscriber information request. Thus, only after the subscriber information request has been properly authenticated will the database server transfer the subscriber information to the transaction server.

An apparatus and methods for transferring subscriber information requests to information service providers are provided. The public key cryptography message transfers protect cross reference information between the subscriber information and the subscriber identification. Only the database server has access to both the subscriber information and the subscriber identification in decrypted form. Thus, the transaction server is discouraged from reconstructing the contents of the database server.

Other aspects and advantages of the present invention can be seen upon review of the figures, the detailed description, and the claims which follow.

DETAILED DESCRIPTION

The invention will be described with respect to the Figures in which FIG. 1 generally shows a digital transmission system, as for example a direct broadcast satellite system. It is presumed that a single satellite transponder accommodates a plurality of respective TV programs in time division multiplexed format.

Figure 1:
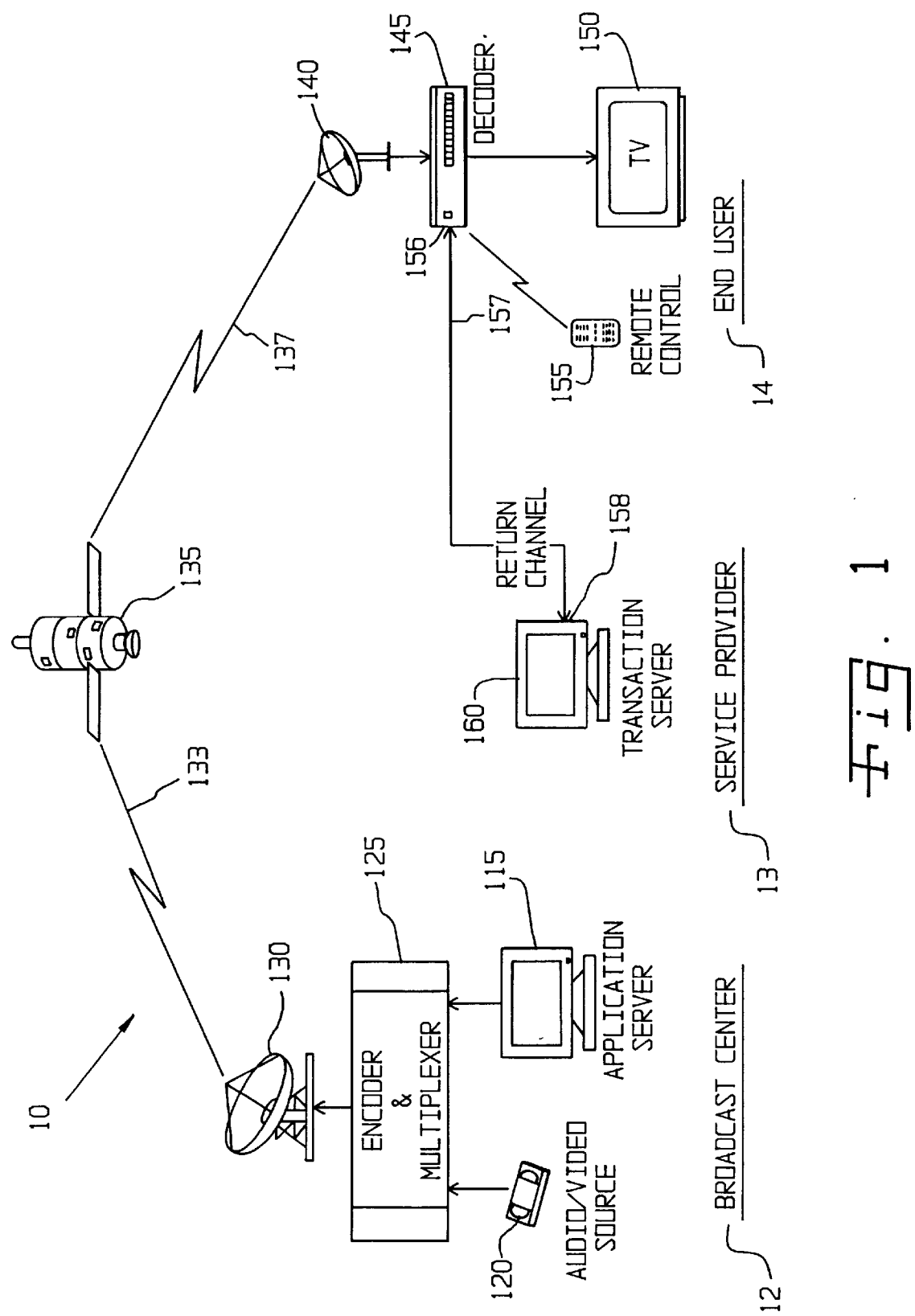
FIG. 1 illustrates a system level block diagram for digital transmissions in a direct broadcast satellite system.

Referring to FIG. 1, the direct broadcast satellite system 10 includes a broadcast center 12, service provider 13, and an end user 14. The broadcast center 12 includes an application server 115, an audio and video source 120, encoder and multiplexer 125, and satellite transmitter 130. The application server 115 controls execution of interactive TV applications which are loaded into the logic circuits of the application server 115 to perform a series of specifically identified operations dictated by the interactive TV applications.

The interactive TV applications include associated audio and video information sources 120. The application server 115 synchronizes the interactive TV applications and the associated audio and video information sources 120 into transport packets that provide inputs to the encoder and multiplexer 125. The encoder and multiplexer 125 receives the transport packets and encodes the transport packets for transmission. Satellite transmitter 130 time-multiplexes the transport packets and transmits the transport packets as upload signal 133 to satellite 135.

The broadcast center 12 is described in detail in issued U.S. Pat. No. 5,448,568 entitled "System of Transmitting an Interactive TV Signal" assigned to Thomson Consumer Electronics, Inc. issued Sep. 5, 1995. The U.S. Pat. No. 5,448,568 is herein incorporated by reference in its entirety.

Satellite 135 receives the upload signal 133 and transmits download signal 137 to end user 14. The end user 14 includes satellite dish 140, decoder 145, TV 150, remote control 155, and return channel 157. Satellite dish 140 receives the download signal 137 and provides an output to decoder 145. The decoder 145 includes a software operating system loaded into the logic circuits of the decoder 145 that performs a series of steps to control the operations of the decoder 145. The decoder 145 receives the download signal 137 from satellite dish 140 and decodes the transmitted interactive TV application and its associated audio and video information 120. The decoder 145 executes the interactive TV application and provides audio and video outputs to TV 150. According to the present invention, the decoder 145 includes an MPEG-2 (Moving Pictures Experts Group) video decoder.

Remote control 155 provides inputs to the decoder to select execution of other interactive TV applications for output to TV 150. The decoder 145 includes an input/output port 156 that couples to return channel 157 for communication to service provider 13.

The service provider 13 includes a transaction server 160 to provide local interaction with the end user 14. The transaction server 160 includes an input/output port 158 which couples to return channel 157. The transaction server 160 provides monitoring of transactions performed by the end user 14 and updating of the software operating system for the decoder 145 via return channel 157. The return channel 157 may be a telephone line or a cable line.

Figure 2:
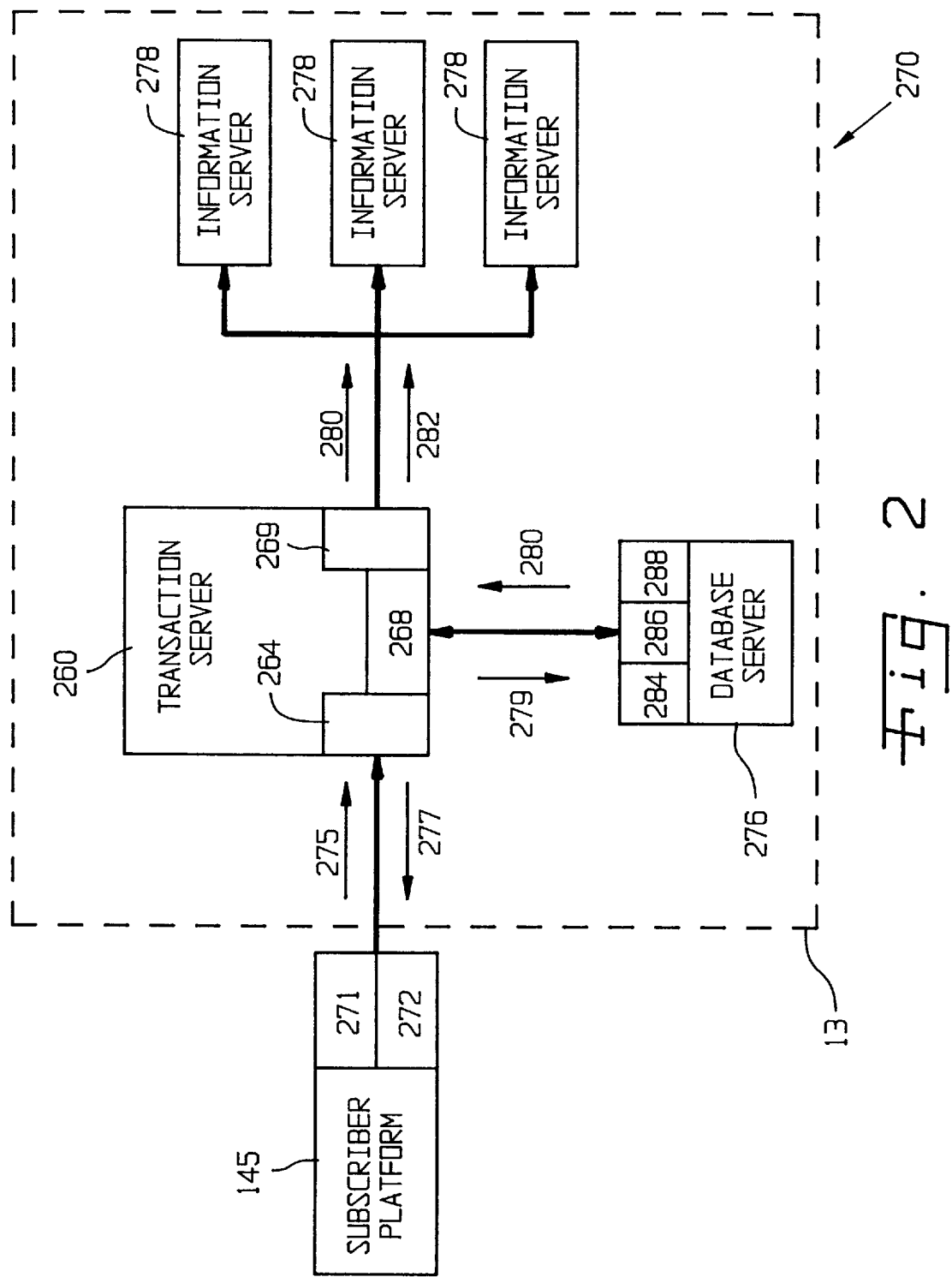
FIG. 2 illustrates a transitional server system block diagram in accordance with the present invention.

With particular reference to FIG. 2, there is shown a transactional server system 270 for transferring subscriber information requests to information service providers in accordance with the present invention. The transactional server system 270 includes a subscriber platform 145 (also referred as decoder 145 of FIG. 1), a transaction server 260, a database server 276 and at least one information server 278. Dashed line represents inclusion of the transaction server 260, the database server 276, and the application servers 278 as part of the service provider 13 of FIG. 1 for purposes of clarity to the present invention. The transactional server system 270 prevents the transaction server 260 from reconstructing the contents of the database server 276.

In brief, the subscriber platform 145 has a subscriber identification and generates a message request block. The message request block requests information from the information servers 278. The subscriber platform 145 transfers an information request 275 which includes an encrypted subscriber identification and the message request block to the transaction server 260.

The transaction server 260 couples to the subscriber platform 145. The transaction server 260 receives the message request block and the encrypted subscriber identification. The transaction server 260 provides a subscriber information request 279 from the database server 276 which includes the encrypted subscriber identification.

The database server 276 couples to the transaction server 260 and receives the subscriber information request 279 from the transaction server 260. The database server 276 provides storage for subscriber information and subscriber identification. The database server 276 includes a cross reference table which provides a link between subscriber information and subscriber identification. Upon receipt of the subscriber information request 279, the database server 276 decrypts the subscriber identification to access the subscriber information from storage and transfers the subscriber information 280 to the transaction server 260.

At least one information server 278 couples with the transaction server 260. The transaction server 260 transfers the subscriber information 280 and the subscriber message request 282 to the information servers 278. The transaction server 260 returns a subscriber acknowledge 277 to the subscriber platform 145.

Furthermore, the subscriber platform 145 includes logic circuits in which loaded open TV transmission applications execute to perform a series of interactive transactions between the user 14 (FIG. 1) and the subscriber platform 145. The subscriber platform 145 includes a message generator 271 which queues message requests including advertising information requests. The subscriber platform 145 concatenates the queued message requests into a message request block for transfer to the transaction server 260.

According to one aspect of the present invention, the information requests 275 which include the message requests are forwarded automatically at a specific time of the day or night. In another aspect, an external trigger is provided to forward messages upon an electronic queue. In another aspect, the messages are forwarded when a message in the message queue reaches a certain age.

The subscriber platform 145 includes an encryptor 272 to secure message transfers to the transaction server 260. The subscriber platform 145 includes a database server public key and encrypts the subscriber identification with the database server public key. The encryptor 272 also "salts"

the encrypted subscriber identification by packing the subscriber identification with additional information. This salting provides an additional level of security to further discourage reconstruction of the subscriber identification.

The subscriber platform 145 also uses a symmetric encryption system having a single secret key to encrypt the message request block. Single secret key cryptography can both encrypt and decrypt a message. The single secret key cryptography enables rapid encryption of larger data sets as opposed to the public key cryptography. Thus, because the message request block typically contains larger sets of data, the subscriber platform 145 encrypts the message request block with DES (Digital Encryption Standard) to provide a DES message request block.

DES is an encryption block cipher defined and endorsed by the U.S. government in 1977 as an official standard. DES is one of the most well-known and widely used cryptosystem in the world. There are several practical considerations that can affect the security of the encrypted DES data. An attack with sustained data analysis could uncover the secret key. The DES key should be frequently changed to optimize security. Accordingly, the DES key of the present invention is a random DES key, generated by the subscriber platform 145.

Although DES is used to encrypt the message request block in accordance with the present invention, it can be appreciated that various bulk encryption algorithms may be used as alternatives to DES in accordance with the present invention. One is FEAL (Fast Encryption Algorithm). The U.S. government recently announced a new algorithm called Skipjack as part of its Capstone project. RIVEST has developed the ciphers RC2 and RC4 which can be made as secure as necessary because they use variable key sizes.

Once the message request block is DES encoded to provide the DES message request block, the subscriber platform 145 generates a verify hash value of the DES message. This verify hash value is encrypted or "signed" with the subscriber platform private key to provide a signed hash value or digital signature.

Next, the subscriber platform 145 encrypts the random generated DES key with the transaction server public key to provide an encrypted DES key. A transaction server private key is required to decrypt the encrypted DES key; thus, only the transaction server 260 having the transaction private key can decrypt the encrypted DES key. The subscriber platform 145 transmits the information request 275 having the DES message request block, the signed hash value, the encrypted subscriber identification, and the encrypted DES key to the transaction server 260.

The transaction server 260 includes a receive processor 264 which receives the information request 275 having the DES message request block, the signed hash value, the encrypted subscriber identification, and the encrypted DES key from the subscriber platform 145. The transaction server 260 includes an information request generator 268 which calculates a DES hash value from the DES message request block. The information request generator 268 generates a subscriber information request 279 having the signed hash value, the DES hash value, and encrypted subscriber identification to the database server 276. The subscriber information request 279 prompts the database server to return subscriber information 280.

The database server 276 includes message decryptor processor 286 which decrypts the encrypted subscriber identification with the database server private key to produce a serial number of the subscriber platform 145. The database server 276 includes a retrieval processor 284 which retrieves a subscriber platform public key stored in a location that corresponds with the serial number of the subscriber platform 145. With the subscriber public key, the decryptor processor 286 decrypts the signed hash value to produce the verify hash value that was generated from the DES message request by the subscriber platform 145. The database server 276 include a verifier processor 288 which compares the verify hash value from the transaction server 260 with the DES hash value for a match to authenticate the subscriber information request 279 from the transaction server 260.

If the DES hash value and the verify hash value do not match, the verifier 288 sends a NAK (Not Acknowledged) to the transaction server 260 which responds by cancelling the subscriber information request. When the DES hash value matches the verify hash value, the verifier 288 returns an ACK (acknowledge) to the subscriber information request 279 and provides the subscriber information 280 which corresponds to the serial number of the subscriber platform 145 to the transaction server 260.

The transaction server 260 includes a decryptor processor 269 which decrypts the encrypted DES key with its private key to produce the DES key. Once the DES key is decrypted, the decryptor processor 269 decrypts the DES message request block to produce the subscriber requests which include the advertising information requests. The decrypted message request block is disconcatenated into component messages. For each component message request in the message request block, the receive processor 264 sends a confirmation to the subscriber platform 145. The decryptor processor 269 also transfers the component message request to an appropriate information server 278 to service the information request 275. Along with each component message request, the transaction server 260 includes the subscriber information 280.

The information servers 278 receive the subscriber information 280 and the subscriber message request 282 and provide responses accordingly. For example, the subscriber information includes mailing information of the subscriber platform 145 so that an information server 278 is able to respond to the information request 275 by direct mailing to the user 14 of the subscriber platform 145.

Figure 3:
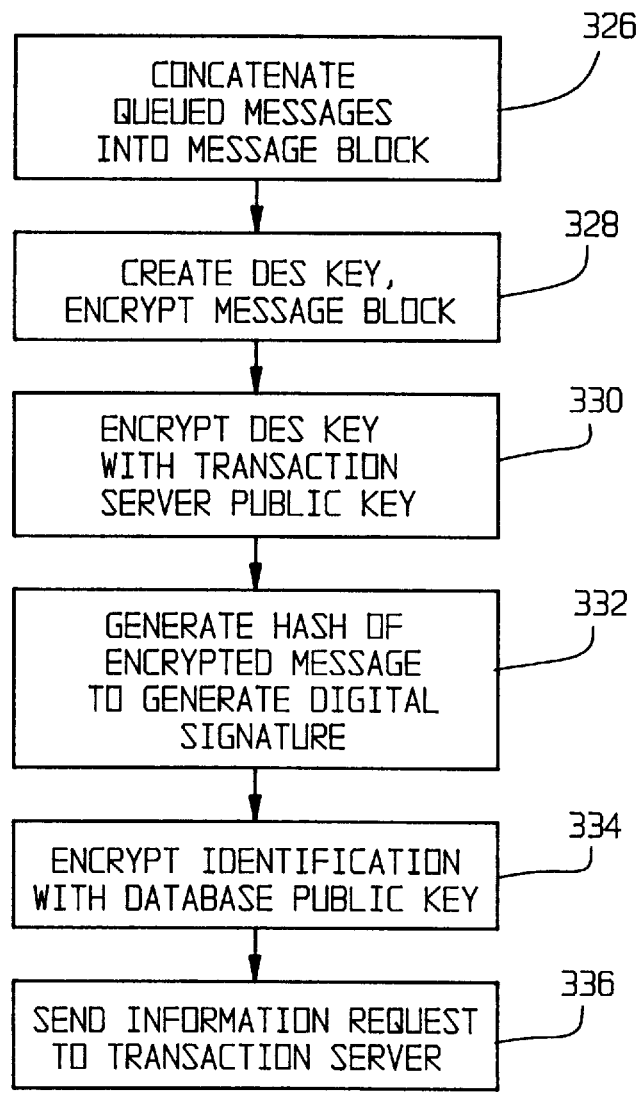
FIG. 3 illustrates a flow diagram of the subscriber platform generating an information request.

FIG. 3 illustrates a flow diagram of the subscriber platform 145 as it generates a information request 275. In step 326, the subscriber platform 145 generates messages and concatenates the messages into a message request block which includes an advertising request. Next, the subscriber platform 145 randomly generates a DES key and encrypts the message request block with the DES key in step 328. Step 330 encrypts the DES key with the transaction server public key to provide an encrypted DES key.

In order to enable the database server 276 to authenticate the origin of the messages, the subscriber generates a verify hash value of the encrypted message request block and signs the hash value with its private key to provide the signed hash or also referred to as a digital signature in step 332. Because the digital signature is encrypted with the subscriber private key, the signature is decrypted with the subscriber platform public key. The database server 276 includes a copy of the subscriber platform public key. In step 334, the subscriber identification is encrypted with the database server public key to provide an encrypted subscriber identification which only the database server 276 can decrypt with its private key. In step 336, the subscriber platform 145 sends the information request 275 which includes the encrypted message request block, the encrypted DES key, the signed hash value, and the encrypted subscriber identification to the transaction server 260.

Figure 4:
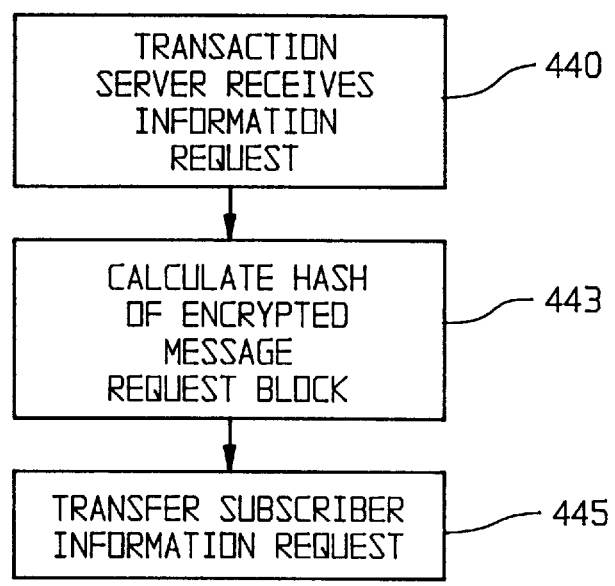
FIG. 4 illustrates a flow diagram of the transaction server responding to an information request from the subscriber platform.

FIG. 4 illustrates a flow diagram of the transaction server 260 as it receives a information request 275 from the subscriber platform 145. The flow diagram begins with step 440 where the transaction server 260 receives the information request 275 including the encrypted message request block, the encrypted DES key, the signed hash value, the encrypted message request block and the encrypted subscriber identification. Next, the transaction server 260 calculates a hash value for the encrypted message request block to provide a DES hash value in step 443. The flow diagram ends with step 445 where the transaction server 260 generates a subscriber information request 279 which includes transferring the signed hash value, the DES hash value, and the encrypted subscriber identification to the database server 276.

Figure 5:
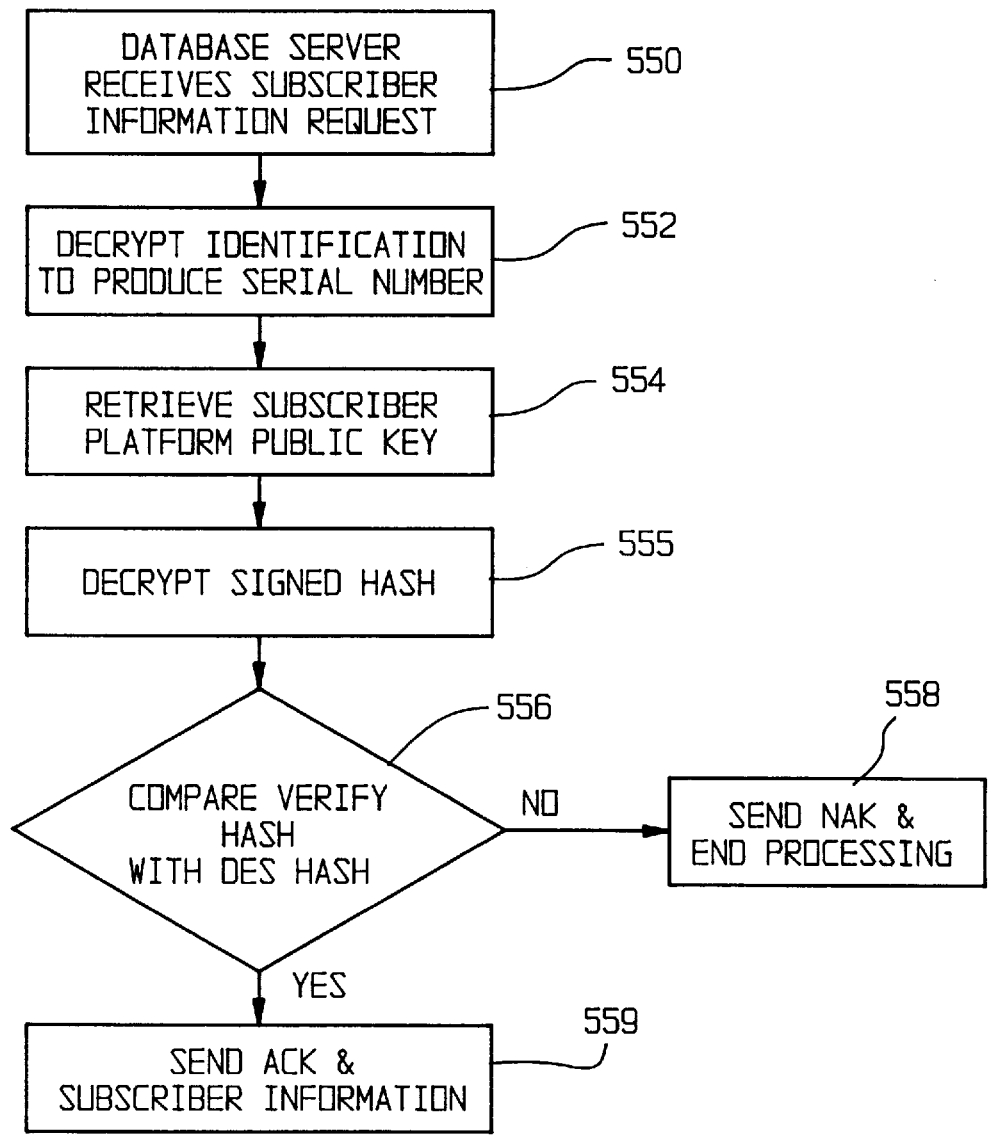
FIG. 5 illustrates a flow diagram of the database server responding to a subscriber information request from the transaction server.

FIG. 5 illustrates a flow diagram of the database server 276 as it receives the subscriber information request 279. The flow diagram begins with step 550 where the database server 276 receives the subscriber information request 279 including the signed hash value, the DES hash value, and the encrypted subscriber identification from the transaction server 260. In step 552, the database server 276 decrypts the encrypted subscriber identification with its private key to produce a serial number of the subscriber platform 145. Next, the database server 276 retrieves a subscriber platform public key stored in a location that corresponds with the serial number of the subscriber platform 145 in step 554. With the subscriber public key, step 555 provides that the database server 276 decrypts the signed hash value to produce the verify hash value that was originally generated from the DES message request by the subscriber platform 145. Verification step 556 provides that the database server 276 compares the verify hash value from the subscriber platform 145 with the DES hash value from the transaction server 260 for a match to authenticate the subscriber information request from the transaction server 260.

Step 558 provides that when the DES hash value and the verify hash value do not match, the database server 276 sends a NAK to the transaction server 260 and ends server processing on the subscriber information request. In step 159, when the DES hash value matches the verify hash value, the database server 276 returns an ACK to the subscriber information request and provides the subscriber information 280 corresponding with the subscriber platform 145 serial number to the transaction server 260.

Figure 6:
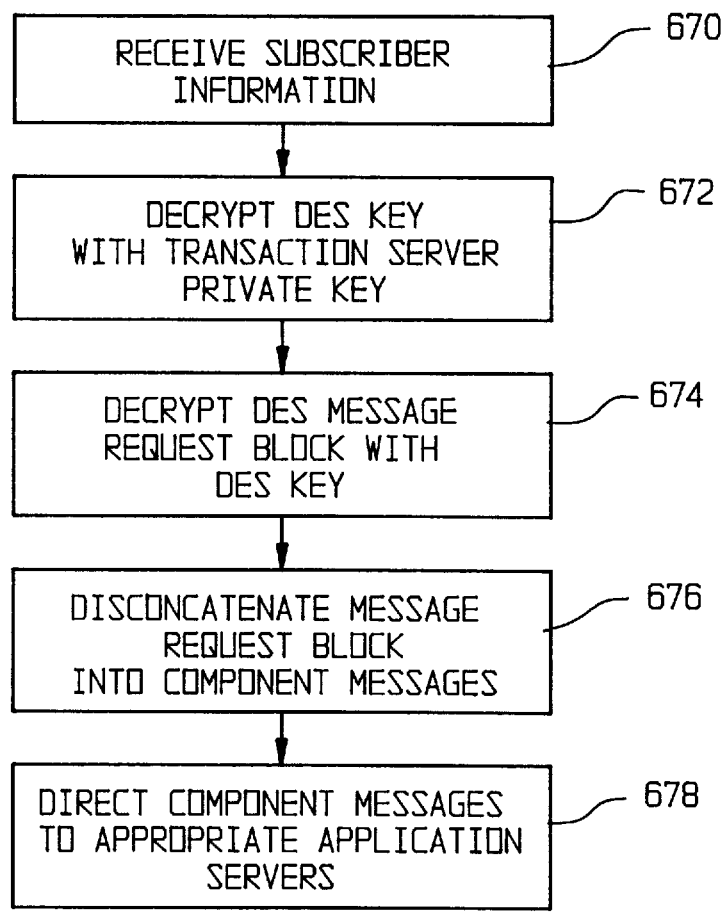
FIG. 6 illustrates a flow diagram of the transaction server responding to subscriber information from the database server.

FIG. 6 illustrates a flow diagram of the transaction server 260 as it receives the subscriber information 280 from the database server 276. The flow diagram begins with step 670 where the transaction server 260 receives the requested subscriber information 280. Next, the transaction server 260 decrypts the encrypted DES key with its private key to produce the DES key in step 672. Once the DES key is decrypted, step 674 provides decrypting of the DES message request block to produce the subscriber message requests. Because the subscriber message requests are concatenated into a message request block, step 676 disconcatenates the message request block into component messages. In step 678, the transaction server 260 directs each component message request of the message request block and the subscriber information 280 to an appropriate information server 278 corresponding to the message request.

Accordingly, an apparatus and method for operating a transactional server system in an interactive environment have been provided. A transaction server 260 processes information requests from subscriber platforms having subscriber identifications which are secret. Cryptography message requests having the subscriber identifications are transferred to the transaction server 260. The transaction server 260 transfers the encrypted subscriber identifications to access subscriber data from a database server. Only the database server has access to both the subscriber information and the subscriber identification in decrypted form. The encrypted message transfers protects cross reference information between the subscriber information and the subscriber identification. Thus, the transaction server can not reconstruct the contents of the database server. Although the embodiments for a transactional server system have been disclosed with reference to an interactive TV system, variations of the transactional server system according to the present invention are applicable in other network applications.

The foregoing description of a preferred embodiment of the invention has been presented for purposes of illustration and description. It is not intended to be exhaustive or to limit the invention to the precise forms disclosed. Many modifications and variations will be apparent to the practitioners skilled in the art. It is intended that the scope of the invention be defined by the following claims and their equivalents.

What is claimed is:

1. A transactional server system for transferring subscriber information requests to information service providers comprising:

a subscriber platform configured to transfer an encrypted identification and a message request block;

a transaction server coupled to the subscriber platform to initiate a subscriber information request in response to the message request block and the encrypted identification, and transfer the message request block to the information service providers in response to subscriber information; and a database server coupled to the transaction server and having a plurality of subscriber information configured to receive the subscriber information request and decrypts the encrypted identification to provide the subscriber information to the transaction server.

2. The transactional server system according to claim 1, wherein the message request block includes a plurality of informational requests.

3. The transactional server system according to claim 1, wherein the database server authenticates the encrypted identification received from the transaction server to verify that the encrypted identification originated from the subscriber platform.

4. The transactional server system according to claim 1, wherein the subscriber platform includes a database server public key and is configured to generate the encrypted identification with the database server public key.

5. The transactional server system according to claim 4, wherein the database server includes a database server private key to decrypt the encrypted identification.

6. The transactional server system according to claim 1, wherein the subscriber platform includes a subscriber platform private key and is configured to generate a signed hash with the subscriber platform private key from the message request block.

7. The transactional server system according to claim 6, wherein the transaction server is configured to provide a message request block hash in response to the message request block.

8. The transactional server system according to claim 7, wherein:

the message request block includes the signed hash from the subscriber platform and the message request block hash from the transaction server; and the database server is configured to receive the message request block and includes a subscriber public key to decrypt the signed hash to provide a subscriber signature that is compared with the message request block hash to authenticate the subscriber information request.

9. The transactional server system according to claim 8, wherein the database server is configured to transfer the subscriber information to the transaction server in response to a proper authentication.

10. A method of operating a transactional processor for requesting information in an interactive environment comprising the steps:

transferring an information request having an identification and requested data to a transaction server;

transferring the information request to a database server;

verifying the information request to validate originality of the information request is indeed a subscriber request;

retrieving subscriber information corresponding to the identification;

transferring the subscriber information to the transaction server; and transferring the subscriber information and the requested data to an application processor which provides the requested data to at least one subscriber based on the subscriber information.

11. A method of operating a transactional processor system for requesting information in an interactive environment comprising the steps:

encrypting an information request to provide an encrypted request information and an encrypted identification transferring the information request having the encrypted identification and the encrypted request information to a transaction server;

transferring the information request to a database server;

verifying the information request to validate originality of the information request;

retrieving subscriber information corresponding to the encrypted identification;

transferring the subscriber information to the transaction server; and transferring the subscriber information and the encrypted request information to an application processor.

12. The method of operating the transactional server system according to claim 11 further comprising the step:

generating a verification hash of the encrypted request information; and encrypting the verification hash with a subscriber private key to provide a signed hash.

13. The method of operating the transactional server system according to claim 12, wherein the step encrypting the information request includes the step encrypting the encrypted identification with a database public key.

14. The method of operating the transactional server system according to claim 13, wherein the step transferring the information request to the transaction server includes the step transferring the encrypted request information, the encrypted identification, and the signed hash.

15. The method of operating the transactional server system according to claim 14, wherein the step transferring the information request to the database server includes the steps:

generating a request information hash from the encrypted request information; and transferring the request information hash, the signed hash, and the encrypted identification to the database server.

16. The method of operating the transactional server system according to claim 15, wherein the step of verifying the information request includes the steps:

decrypting the encrypted identification with a database private key to provide a serial number;

retrieving a subscriber public key corresponding to the serial number, decrypting the signed hash with the subscriber public key to provide the verification hash; and comparing the verification hash with the request information hash to determine a match.

17. The method of operating the transactional server system according to claim 16, wherein the step of retrieving subscriber information includes the step associating the serial number with a subscriber information storage location within the database to provide the subscriber information.

18. The method of operating the transactional server system according to claim 17, wherein the step retrieving the subscriber information includes the steps:

decrypting the encrypted request information to provide requested data; and transferring the requested data and the subscriber information to the application processor.

19. The method of operating the transactional server system according to claim 18, wherein the requested data includes a plurality of components and the step of retrieving the subscriber information from the database in response to the serial number include splitting the requested data into components to provide application data corresponding to an associated information server.

20. A method of operating a transaction server comprising the steps:

receiving an information request having an identification and requested data wherein the information request includes an encoded message;

decrypting a key with a transaction server private key:

retrieving subscriber information corresponding to the identification; and transferring the subscriber information and the requested data to an application processor which provides the requested data to a subscriber based on the subscriber information.

21. A method of operating a transaction server comprising the steps:

receiving an information request having an identification and requested data wherein the information request includes a DES encoded message and the step of receiving the information request includes decrypting a DES key with a transaction server private key;

retrieving subscriber information corresponding to the identification; and transferring the subscriber information and the requested data to an application processor.

22. The method of operating the transaction server according to claim 21, wherein the step of retrieving subscriber information include the step generating a DES hash from the DES encoded message.

23. The method of operating the transaction server according to claim 21, wherein the step of retrieving subscriber information includes the step of decrypting the DES encoded message with the DES key.

24. The method of operating the transaction server according to claim 21, wherein the step of transferring the subscriber information and requested data includes the step of disconcatenating the information request to provide component messages.

25. A method of operating a database server comprising the steps:

retrieving subscriber information in response to a subscriber information request having an identification from a transactional server;

verifying the subscriber information request to validate originality of the subscriber information request is indeed a subscriber request;

retrieving the subscriber information corresponding to the identification; and transferring the subscriber information to a transaction server.

26. A method of operating a database server comprising the steps:

retrieving subscriber information in response to a subscriber information request having an identification;

decrypting the identification to produce a serial number;

verifying the subscriber information request to validate originality of the subscriber information request;

retrieving the subscriber information corresponding to the identification; and transferring the subscriber information to a transaction server.

27. The method of operating a database server according to claim 26, wherein the step of retrieving the subscriber information includes retrieving the subscriber information corresponding to the serial number.

28. The method of operating a database server according to claim 27, wherein the subscriber information request includes a subscriber signature and the step of verifying includes the step retrieving a subscriber public key to decrypt a subscriber signature.

29. The method of operating a database server according to claim 28, wherein the step of retrieving the subscriber public key includes the step retrieving the subscriber public key from a location corresponding to the serial number.

30. A transaction server for processing information requests comprising:

a receiver configured to receive an information request having an identification and requested data;

a subscriber information requestor configured to provide an encoded subscriber information request in response to the identification to a data base; and a processor configured to receive the subscriber information from the database and provide message requests in response to the subscriber information and the requested data to an application server.

31. A transaction server for processing information requests comprising:

a receiver configured to receive an information request including an encoded message having an identification and requested data;

a decryptor configured to decrypt the information request;

subscriber information requestor configured to provide an encoded subscriber information request in response to the identification; and a processor configured to receive the subscriber information and provide message requests in response to the subscriber information and the requested data.

32. The transaction server according to claim 31, wherein the encoded message includes a DES encoded message and the decryptor is configured to retrieve a transaction server private key and decrypt a DES key for the DES encoded message.

33. The transaction server according to claim 32, wherein the decryptor is configured to generate a DES hash from the DES encoded message.

34. The transaction server according to claim 31 wherein the processor is configured to disconcatenate the information request to provide component messages.

35. A database server for receiving encoded information requests comprising:

a decryptor configured to decrypt a subscriber information request having an identification;

a verifier configured to verify the subscriber information to validate originality of the subscriber information request; and a retrieve processor configured to retrieve the subscriber information corresponding to the identification and transfer the subscriber information to a transaction server.

36. The database server according to claim 35, wherein the decryptor is configured to decrypt the identification to produce a serial number.

37. The database server according to claim 36, wherein the retrieve processor is configured to cross reference the serial number to provide the subscriber information.

38. The database server according to claim 35, wherein the information request includes a digital signature and the decryptor is configured to decrypt the signature to provide a DES hash.

39. The database server according to claim 38, wherein the information request includes a verify hash and the verifier is configured to compare the verify hash with the DES hash for a match.

40. The database server according to claim 38, wherein the retrieve processor is configured to retrieve a particular public key for the decryptor to decrypt the digital signature.

41. A subscriber platform for providing information requests having a subscriber identification comprising:

a message generator configured to generate a message block;

an encryptor configured to encrypt the message block and generate a digital signature of the message block;

an encrypted identification generator configured to encrypt the subscriber identification to provide an encrypted identification; and a transmitter configured to transmit the message block, the digital signature and the encrypted identification to provide an information request.

42. The subscriber platform according to claim 41, wherein the encryptor is configured to generate a random DES key and encrypt the message block to provide a DES message block.

43. The subscriber platform according to claim 42, wherein the encryptor is configured to generate a DES hash of the DES message block and sign the DES message block to provide a digital signature.

44. The subscriber platform according to claim 41, wherein the encrypted identification generator is configured to encrypt the identification with a particular public key.

45. A method of operating a subscriber platform having a subscriber identification to provide information requests comprising the steps:

concatenating message requests to provide a message block;

encrypting the message block;

generating a hash of the message block;

signing the hash to provide a digital signature;

encrypting the subscriber identification to provide an encrypted identification; and transferring the encrypted message block, the digital signature, and the encrypted identification to provide an information request.

46. The method of operating the subscriber platform according to claim 45, wherein the step of encrypting the message block includes the steps:

creating a random DES key; and encrypting the message block with the DES key to provide an DES message block.

47. The method of operating the subscriber platform according to claim 46, wherein the step of encrypting the message block includes the step encrypting the DES key with a particular public key.

48. The method of operating the subscriber platform according to claim 45, wherein the step of signing includes the step encrypting the hash with a subscriber private key.

49. The method of operating the subscriber platform according to claim 45, wherein the step of encrypting the subscriber identification includes the step of encrypting the subscriber identification with a particular public key.

* * * * *